US011903394B2

(12) United States Patent
Yamawaki et al.

(10) Patent No.: US 11,903,394 B2
(45) Date of Patent: Feb. 20, 2024

(54) BEVERAGE COMPOSITION

(71) Applicant: KAO CORPORATION, Tokyo (JP)

(72) Inventors: Kenji Yamawaki, Narita (JP); Yukiteru Sugiyama, Narita (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 17/896,244

(22) Filed: Aug. 26, 2022

(65) Prior Publication Data

US 2022/0408752 A1  Dec. 29, 2022

Related U.S. Application Data

(62) Division of application No. 16/464,635, filed as application No. PCT/JP2017/039094 on Oct. 30, 2017, now Pat. No. 11,464,240.

(30) Foreign Application Priority Data

Nov. 29, 2016  (JP) ................. 2016-231578

(51) Int. Cl.
*A23F 3/16* (2006.01)
*A23F 3/22* (2006.01)
*A23F 3/38* (2006.01)
*A23L 2/38* (2021.01)
*A23L 2/52* (2006.01)

(52) U.S. Cl.
CPC .............. *A23F 3/22* (2013.01); *A23F 3/38* (2013.01); *A23L 2/38* (2013.01); *A23L 2/52* (2013.01)

(58) Field of Classification Search
CPC ...... A23F 3/16; A23F 3/00; A23F 3/38; A23F 3/22; A23L 2/38; A23L 2/52
See application file for complete search history.

(56) References Cited

U.S. PATENT DOCUMENTS

| 2005/0003068 | A1 | 1/2005 | Kester et al. |
| 2009/0041921 | A1 | 2/2009 | Maruyama. et al. |
| 2009/0104337 | A1* | 4/2009 | Abe .......................... A23F 3/20 426/597 |
| 2010/0055243 | A1 | 3/2010 | Saito |
| 2010/0278972 | A1 | 11/2010 | Shikata et al. |
| 2016/0219897 | A1 | 8/2016 | Shimoda et al. |

FOREIGN PATENT DOCUMENTS

| CN | 1771823 A | 5/2006 |
| CN | 101896077 A | 11/2010 |
| CN | 105472990 A | 4/2016 |
| EP | 1 527 693 A1 | 4/2005 |
| EP | 2 225 952 A1 | 9/2010 |
| JP | 10-290666 A | 11/1998 |
| JP | 2004-129669 A | 4/2004 |
| JP | 2007-61083 A | 3/2007 |
| JP | 2007-228911 A | 9/2007 |
| JP | 2007-274920 A | 10/2007 |
| JP | 2009-171962 A | 8/2009 |
| JP | 2010-11858 A | 1/2010 |
| JP | 2010-57414 A | 3/2010 |
| JP | 2014-14313 A | 1/2014 |
| JP | 5452748 B1 | 3/2014 |
| JP | 2014-68630 A | 4/2014 |
| JP | 2014-68636 A | 4/2014 |
| JP | 2014-212759 A | 11/2014 |
| JP | 2014-226040 A | 12/2014 |
| JP | 2015-116132 A | 6/2015 |
| JP | 2016-119882 A | 7/2016 |
| JP | 2018-88910 A | 8/2018 |
| WO | WO 2014/174706 A1 | 10/2014 |
| WO | WO 2015/144495 A1 | 10/2015 |

OTHER PUBLICATIONS

International Search Report dated Jan. 23, 2018 in PCT/JP2017/039094 filed on Oct. 30, 2017.

Extended European Search Report dated May 26, 2020 in Patent Application No. 17875245.7; citing documents 4 and 20-24 therein, 7 pages.

* cited by examiner

*Primary Examiner* — Hong T Yoo
(74) *Attorney, Agent, or Firm* — Oblon, McClelland, Maier & Neustadt, L.L.P.

(57) ABSTRACT

Provided is a beverage composition, including: non-polymer catechins; and caffeine, the beverage composition satisfying the following requirements (A), (B), and (C): (A) a mass ratio of caffeine/non-polymer catechins is 0.180 or less; (B) particles contained in the beverage composition have an average particle size of 3 μm or less; and (C) a turbidity is 30 NTU or more.

6 Claims, No Drawings

BEVERAGE COMPOSITION

CROSS-REFERENCE TO RELATED APPLICATIONS

The present application is a divisional of U.S. application Ser. No. 16/464,635, now U.S. Pat. No. 11,464,240, having a filing date of May 28, 2019. U.S. application Ser. No. 16/464,635 is a 35 U.S.C. § 371 national stage application of International patent application PCT/JP2017/039094, filed Oct. 30, 2017, which is based on and claims the benefit of priority to Japanese Application No. 2016-231578, filed Nov. 29, 2016. The entire contents of these applications are incorporated herein by reference.

FIELD OF THE INVENTION

The present invention relates to a beverage composition.

BACKGROUND OF THE INVENTION

Non-polymer catechins are natural polyphenolic compounds contained in tea leaves and the like. The non-polymer catechins have various physiological activities, and hence their application to foods and beverages has been attracting attention. Of those, consumer need for a packaged tea beverage has been increasing because of convenience of allowing easy ingestion as a lifestyle habit. In recent years, a wide variety of packaged tea beverages appealing to consumers' preferences have been actively developed. For example, from the viewpoint of aesthetics of a product, there has been proposed a green tea beverage clarified by cooling a green tea extract solution to promote precipitation of a turbid component and removing the turbid component through centrifugation at a predetermined speed (Patent Document 1). Meanwhile, in recent years, from the viewpoint of an improvement in taste and flavor, for example, with attention focused on palatability of the turbid component, there has been proposed a turbid tea beverage having an increased turbidity of 0.1 or more (Patent Document 2).

[Patent Document 1] JP-A-10-290666
[Patent Document 2] JP-A-9014-14313

SUMMARY OF THE INVENTION

The present invention provides a beverage composition, comprising: non-polymer catechins; and caffeine, the beverage composition satisfying the following requirements (A), (B), and (C): (A) a mass ratio of caffeine/non-polymer catechins is 0.180 or less; (B) particles contained in the beverage composition have an average particle size of 3 μm or less; and (C) a turbidity is 30 NTU or more.

The present invention provides a green tea extract, comprising: non-polymer catechins; and caffeine, in which (A) a mass ratio of caffeine/non-polymer catechins is 0.180 or less, and the green tea extract satisfies the following requirements (B) and (C) when subjected to concentration adjustment so as to have a concentration of the non-polymer catechins of 175 mg/100 mL: (B) particles contained in the concentration-adjusted solution have an average particle size of 3 μm or less; and (C) the concentration-adjusted solution has a turbidity of 30 NTU or more.

The present invention further provides a green tea extract, obtained by at least a step of bringing raw tea leaves into contact with hot water, in which (A) a mass ratio of caffeine/non-polymer catechins is 0.180 or less, and the green tea extract satisfies the following requirements (B) and (C) when subjected to concentration adjustment so as to have a concentration of the non-polymer catechins of 175 mg/100 mL: (B) particles contained in the concentration-adjusted solution have an average particle size of 3 μm or less; and (C) the concentration-adjusted solution has a turbidity of 30 NTU or more.

The present invention further provides a production method for a green tea extract, comprising at least a step of bringing raw tea leaves into contact with hot water.

DETAILED DESCRIPTION OF THE INVENTION

There have conventionally been conflicting demands for removing a turbid component to improve the aesthetics of a product, and increasing the turbid component to improve the taste and flavor.

The present invention relates to a beverage composition achieving both an improvement in taste and flavor by the increase of a turbid component, and an improvement in aesthetics by the suppression of the settlement of the turbid component.

The inventors of the present invention found that a beverage composition achieving both an improvement in taste and flavor by the increase of a turbid component, and an improvement in aesthetics by the suppression of the settlement of the turbid component is obtained by controlling a mass ratio of caffeine/non-polymer catechins and the average particle size of particles to values equal to or lower than specific values, and controlling a turbidity to a value equal to or higher than a specific value.

According to the present invention, it is possible to provide the beverage composition achieving both an improvement in taste and flavor by the increase of a turbid component, and an improvement in aesthetics by the suppression of the settlement of the turbid component, and a green tea extract useful for the beverage composition.

[Beverage Composition]

A beverage composition of the present invention comprises non-polymer catechins and caffeine. As used herein, the term "non-polymer catechins" is a collective term encompassing gallate-type non-polymer catechins including epigallocatechin gallate, gallocatechin gallate, epicatechin gallate, and catechin gallate, and free non-polymer catechins including epigallocatechin, gallocatechin, epicatechin, and catechin. The content of the non-polymer catechins is defined on the basis of the total amount of the above-mentioned eight kinds, and in the present invention, at least one out of the eight kinds of non-polymer catechins only needs to be contained.

The beverage composition of the present invention has a reduced content of caffeine, and specifically a mass ratio of caffeine/non-polymer catechins ("caffeine/non-polymer catechins") is 0.180 or less. The mass ratio is preferably 0.175 or less, more preferably 0.170 or less, more preferably 0.165 or less, even more preferably 0.160 or less. Such mass ratio "caffeine/non-polymer catechins" is permitted to be 0, but may be 0.001 or more, or 0.01 or more, from the viewpoint of production efficiency. Such mass ratio "caffeine/non-polymer catechins" falls within the range of preferably from 0 to 0.180, more preferably from 0.001 to 0.175, more preferably from 0.001 to 0.170, more preferably from 0.01 to 0.165, even more preferably from 0.01 to 0.160. The contents of the non-polymer catechins and caffeine may be measured by an analysis method appropriate for the state of a measurement sample among generally known analysis methods. For example, analysis may be performed by liquid chromatography, and specifically, analysis may be performed by a method described in Examples to be described later.

The content of the non-polymer catechins in the beverage composition of the present invention is preferably 30 mg or more, more preferably 40 mg or more, more preferably 80 mg or more, even more preferably 110 mg or more, per 100 mL of the beverage composition, from the viewpoints of physiological effects and an enhancement in taste and flavor (richness of green tea), and is preferably 200 mg or less, more preferably 190 mg or less, even more preferably 180 mg or less, per 100 mL of the beverage composition, from the viewpoint of an improvement in aesthetics. Such content of the non-polymer catechins falls within the range of preferably from 30 mg/100 mL to 200 mg/100 mL, more preferably from 40 mg/100 mL to 190 mg/100 mL, more preferably from 80 mg/100 mL to 180 mg/100 mL, even more preferably from 110 mg/100 mL to 180 mg/100 mL.

The content of caffeine in the beverage composition of the present invention is preferably 36 mg or less, more preferably 33 mg or less, even more preferably 30 mg or less, per 100 mL of the beverage composition, from the viewpoint of taste and flavor balance. Such content of caffeine is permitted to be 0 mg/100 mL, but may be 0.18 mg/100 mL or more, or 1.8 mg/100 mg/100 mL or more, from the viewpoint of production efficiency. Such content of caffeine falls within the range of preferably from 0 mg/100 mL to 36 mg/100 mL, more preferably from 0.18 mg/100 mL to 33 mg/100 mL, even more preferably from 1.8 mg/100 mL to 30 mg/100 mL. As used herein, the concept that "the content of caffeine is 0 mg/100 mL" encompasses a case in which the content of caffeine is below the detection limit in the "analysis of caffeine" described in Examples to be described later.

In the beverage composition of the present invention, particles contained in the beverage composition have an average particle size of 3 μm or less. The average particle size is preferably 1.5 μm or less, more preferably 0.9 μm or less, even more preferably 0.6 μm or less, from the viewpoint of an improvement in aesthetics. In addition, such average particle size is preferably 0.1 μm or more, more preferably 0.2 μm or more, even more preferably 0.3 μm or more, from the viewpoint of an enhancement in taste and flavor (richness of green tea). Such average particle size falls within the range of preferably from 0.1 μm to 3 μm, more preferably from 0.1 μm to 1.5 μm, more preferably from 0.2 μm to 0.9 μm, even more preferably from 0.3 μm to 0.6 μm. The particles contained in the beverage composition are water-insoluble suspended solids and/or settleable suspended solids that are derived from a material for producing a beverage, and examples thereof may include water-insoluble suspended solids and/or settleable suspended solids contained in a green tea extract or the like. As used herein, the "average particle of the particles" refers to one measured by a method described in Examples to be described later.

The beverage composition of the present invention has appropriate turbidness, specifically a turbidity of 30 NTU or more. The turbidity is preferably 40 NTU or more, more preferably 50 NTU or more, more preferably 60 NTU or more, more preferably 80 NTU or more, even more preferably 85 NTU or more, from the viewpoint of an enhancement in taste and flavor (richness of green tea). In addition, such turbidity is preferably 300 NTU or less, more preferably 250 NTU or less, even more preferably 200 NTU or less, from the viewpoint of an improvement in aesthetics. Such turbidity falls within the range of preferably from 30 NTU to 300 NTU, more preferably from 40 NTU to 300 NTU, more preferably from 50 NTU to 250 NTU, more preferably from 60 NTU to 200 NTU, more preferably from 80 NTU to 200 NTU, even more preferably from 85 NTU to 200 NTU. Such turbidity preferably satisfies the above-mentioned requirement when the concentration of the non-polymer catechins in the beverage composition falls within the above-mentioned range, and more preferably satisfies the above-mentioned requirement when concentration adjustment is performed so that the content of the non-polymer catechins in the beverage composition may be 1.75 mg/100 mL. In order to cause the concentration of the non-polymer catechins in the beverage composition to fall within the above-mentioned range, the beverage composition is permitted to be subjected to concentration adjustment by being, for example, diluted or concentrated. As used herein, the term "turbidity" refers to one measured by a method described in Examples, and the term "NTU" refers to a measurement unit of formazin turbidity making use of formazin turbidity standards.

The average particle size of the particles in the beverage composition and the turbidity preferably fall within the above-mentioned ranges at the above-mentioned content of the non-polymer catechins.

The beverage composition of the present invention may comprise one or more of additives, such as a sweetener, a flavoring agent, a dye, a vitamin, a fruit juice extract, a vegetable extract, a nectar extract, an herb, an organic acid, an organic acid salt, an inorganic acid, an organic acid salt, an inorganic salt, an antioxidant, a pH adjuster, and a quality stabilizer, as desired. The contents of the additives may be appropriately set within a range in which the purpose of the present invention is not impaired.

The beverage composition of the present invention may be a tea beverage composition or a non-tea beverage composition. Examples of the tea beverage composition include a green tea beverage, an oolong tea beverage, and a black tea beverage. In addition, examples of the non-tea beverage composition include: non-alcoholic beverages, such as a carbonated beverage, a fruit juice, a vegetable juice, a sports beverage, an isotonic beverage, enhanced water, bottled water, near water, a coffee beverage, an energy drink, and a drink for beauty; and alcoholic beverages, such as beer, wine, Japanese sake, a plum liquor, sparkling liquor, whisky, brandy, a clear liquor, rum, gin, and liqueur. Of those, from the standpoint that the effect of the present invention is sufficiently achieved with ease, a tea beverage composition is preferred, and a green tea beverage composition is more preferred. In addition, the form of the beverage composition is not particularly limited, and may be any of a liquid, a gel, a slurry, and the like as long as the form is easy to ingest.

The beverage composition of the present invention may be a packaged beverage. A container therefor is not particularly limited as long as the container is a general packaging container, and examples thereof include a molded container mainly formed of polyethylene terephthalate (so-called PET bottle), a metal can, a paper container composited with a metal foil or a plastic film, and a bottle.

Further, the beverage composition of the present invention may have been subjected to heat sterilization. A method for the heat sterilization is not particularly limited as long as the method complies with a condition specified by an applicable regulation (Food Sanitation Act in Japan). Examples thereof may include a retort sterilization method, a high-temperature short-time sterilization method (HTST method), and an ultrahigh-temperature sterilization method (UHT method). In addition, the method for the heat sterilization may be appropriately selected depending on the kind of the container. For example, when a container filled with a beverage can be subjected to heat sterilization as it is, like a metal can, retort sterilization may be adopted. In addition, when a container such as a PET bottle or a paper container, which cannot be subjected to retort sterilization, is used, there may be adopted: aseptic filling, which involves subjecting a beverage to heat sterilization in advance under the same sterilization conditions as those described above and filling the beverage into a container having been subjected to sterilization treatment in an aseptic environment; or hot-pack filling.

The beverage composition or the present invention may be produced by an appropriate method as long as the above-mentioned requirements (A), (B), and (C) are satisfied. For example, the beverage composition of the present invention may be produced by blending the following green tea extract.

[Green Tea Extract]

A green tea extract of the present invention comprises non-polymer catechins and caffeine, and has a remarkably reduced content of caffeine as compared to a generally contained amount. Specifically, the mass ratio "caffeine/non-polymer catechins" in the green tea extract is 0.180 or less. The mass ratio is preferably 0.175 or less, more preferably 0.170 or less, more preferably 0.165 or less, even more preferably 0.160 or, less. Such mass ratio "caffeine/non-polymer catechins" is permitted to be 0, but may be 0.001 or more, or 0.01 or more, from the viewpoint of production efficiency. Such mass ratio "caffeine/non-polymer catechins" falls within the range of preferably from 0 to 0.180, more preferably from 0.001 to 0.175, more preferably from 0.001 to 0.170, more preferably from 0.01 to 0.165, even more preferably from 0.01 to 0.160.

In the green tea extract of the present invention, the content of the non-polymer catechins in solids is preferably 20 mass % or more, more preferably 25 mass % or more, even more preferably 30 mass % or more, from the viewpoints of physiological effects and an enhancement in taste and flavor, and is preferably 60 mass % or less, more preferably. 50 mass % or less, even more preferably 40 mass % or less, from the viewpoint of taste and flavor balance. Such content of the non-polymer catechins in the solids falls within the range of preferably from 20 mass % to 60 mass %, more preferably from 25 mass % to 50 mass %, even more preferably from 30 mass % to 40 mass %. As used herein, the term "solids" refers to a residue obtained by drying a sample in an electric thermostat dryer at 105° C. for 3 hours to remove volatile substances.

In the green tea extract of the present invention, the content of the caffeine in the solids is preferably 11 mass % or less, more preferably 9 mass % or less, even more preferably 6.5 mass % or less, from the viewpoint of taste and flavor balance. Such content of caffeine in the solids is permitted to be 0 mass %, but may be 0.03 mass % or more, or 0.3 mass % or more, from the viewpoint of production efficiency. Such content of the caffeine in the solids falls within the range of preferably from 0 mass % to 11 mass %, more preferably from 0.03 mass % to 9 mass %, even more preferably from 0.3 mass % to 6.5 mass %. As used herein, the concept that "the content of caffeine is 0 mass %" encompasses a case in which the content of caffeine is below the detection limit in the "analysis of caffeine" described in Examples to be described later.

When the green tea extract of the present invention is subjected to concentration adjustment so as to have a concentration of the non-polymer catechins of 175 mg /100 mL, particles contained in the concentration-adjusted solution have an average particle size of 3 μm or less, and its turbidity is 30 NTU or more. Examples of the particles contained in the concentration-adjusted solution may include water-insoluble suspended solids and/or settleable suspended solids contained in the green tea extract.

The average particle size and the turbidity may be measured after the green tea extract has been subjected to concentration adjustment by being diluted or concentrated so that the concentration of the non-polymer catechins in the green tea extract may be 175 mg/100 mL. Water is generally used as a solvent for the dilution of the green tea extract, and examples of the water include ion-exchanged water, distilled water, natural water, and tap water. Of those, ion-exchanged water is preferred. As a concentration method, there are given, for example, a normal-pressure concentration method involving vaporizing a solvent at normal pressure, a reduced-pressure concentration method involving vaporizing a solvent under reduced pressure, and a membrane concentration method involving removing a solvent by membrane separation. Temperature and pressure conditions at the time of the concentrating may be appropriately selected.

The particles in the concentration-adjusted solution have an average particle size of 3 μm or less. The average particle size is preferably 1.5 μm or less, more preferably 0.9 μm or less, even more preferably 0.6 μm or less, from the viewpoint of an improvement in aesthetics. In addition, such average particle size is preferably 0.1 μm or more, more preferably 0.2 μm or more, even more preferably 0.3 μm or more, from the viewpoint of an enhancement in taste and flavor (richness of green tea). Such average particle size falls within the range of preferably from 0.1 μm to 3 μm, more preferably from 0.1 μm to 1.5 μm, more preferably from. 0.2 μm to 0.9 μm, even more preferably from 0.3 μm to 0.6 μm.

In addition, the concentration-adjusted solution has a turbidity of 30 NTU or more. The turbidity is preferably 40 NTU or more, more preferably 50 NTU or more, more preferably 60 NTU or more, more preferably 80 NTU or more, even more preferably 85 NTU or more, from the viewpoint of an enhancement in taste and flavor (richness of green tea). In addition, such turbidity is preferably 300 NTU or less, more preferably NTU or less, even more preferably 200 NTU or less, from the viewpoint of an improvement in aesthetics. Such turbidity falls within the range of preferably from 30 NTU to 300 NTU, more preferably from 40 NIU to 300 NTU, more preferably from 50 NTU to 250 NTU, more preferably from 60 NTU to 200 NTU, more preferably from 80 NTU to 200 NTU, even more preferably from 85 NTU to 200 NTU.

The green tea extract of the present invention may be produced by an appropriate method as long as the green tea extract has the above-mentioned characteristics. For example, the method preferably comprises steps including at least the following step (a). A detailed description is given below.

Step (a)

The step (a) is a step of bringing raw tea leaves into contact with hot water. With this, caffeine can be selectively removed. As used herein, the term "raw tea leaves" refers to tea leaves after plucking and before heat treatment, or tea leaves stored in a refrigerated or frozen state after plucking and before heat treatment. From the viewpoint of the suppression of fermentation, as the raw tea leaves, it is preferred to use tea leaves within 24 hours after plucking, or use tea leaves stored in a refrigerated or frozen state within 24 hours after plucking.

Tea raw tea leaves as plucked (full leaves) are preferably used as the tea leaves from the viewpoint of the taste and flavor. A plucking method is hand picking, shear plucking, or mechanical picking, but is not particularly limited. The hand picking is, for example, two-leaf picking or three-leaf picking, but is not particularly limited. In addition, the mechanical picking may be performed using a mobile machine, a portable machine, a self-propelled machine, a riding machine, a rail-tracking machine, or the like depending on, for example, the size of the machine and a use method therefor, and is generally performed by normal picking. The tea leaves plucked by any of those methods may be used without being cut. The harvest season of the tea leaves is not particularly limited.

The tea variety of the raw tea leaves is not particularly limited as long as the tea variety is a generally cultivated one, and examples thereof include the genus *Camellia*, such as tea leaves (*Camellia sinensis*) selected from sinensis var. sinensis (including the Yabukita variety), *C. sinensis* var. assamica, and hybrids thereof. Specific examples of the variety may include: Japanese. tea leaves, such as Benifuki, Benihomare, Benifuji, Benihikari, Yabukita, Asatsuyu, Yamatomidori, Makinoharawase, Kanayamidori, Yaeho, Surugawase, Yutakamidori, Okumusashi, Okumidori, Ooiwase, Okuhikari, Meiryoku, Samidori, Komakage, Yamanami, Minekaori, Hatsumomiji, Yamakai, and Karabeni; and tea leaves except the Japanese tea leaves, such as Darjeeling, Uva, Keemun, Assam, and Kenya. One or more of the raw tea leaves may be appropriately selected and used, and stems may be used as well as the tea leaves.

The kind of the hot water with which the raw tea leaves are brought into contact is not particularly limited, and for example, tap water, distilled water, ion-exchanged water, or natural water may be appropriately selected and used.

In addition, the temperature of the hot water with which the raw tea leaves are brought into contact is preferably 83° C. or more, more preferably 85° C. or more, even more preferably 87° C. or more, from the viewpoint of selective removal of caffeine, and is preferably 99° C. or less, more preferably 98° C. or less, even more preferably 97° C. or less, from the viewpoint of temperature control. Such temperature of the hot water falls within the range of preferably from 83° C. to 99° C., more preferably from 85° C. to 98° C., even more preferably from 87° C. to 97° C.

A method for the contact is not particularly limited as long as surfaces of the raw tea leaves can be brought into contact with the hot water, and examples thereof may include a method involving immersing the raw tea leaves in the hot water, and a method involving feeding the hot water in a shower form to the raw tea leaves.

The amount of the hot water to be brought into contact may be appropriately selected depending on the contact method and the scale of production, but is preferably 3 times by mass or more, more preferably 5 times by mass or more, even more preferably 10 times by mass or more, and is preferably 100 times by mass or less, more preferably 75 times by mass or less, even more preferably 50 times by mass or less, with respect to the raw tea leaves, from the viewpoint of selective removal of caffeine. Such amount of the hot water falls within the range of preferably from 3 times by mass to 100 times by mass, more preferably from 5 times by mass to 75 times by mass, even more preferably from 10 times by mass to 50 times by mass, with respect to the raw tea leaves.

A period of time for which the contact with the hot water is performed may be appropriately selected depending on the contact method and the scale, but is preferably 2 minutes or more, more preferably 2.5 minutes or more, even more preferably 3 minutes or more, and is preferably 10 minutes or less, more preferably 9 minutes or less, even more preferably 7 minutes or less, from the viewpoint of selective removal of caffeine. Such contact time falls within the range of preferably from 2 minutes to 10 minutes, more preferably from 2.5 minutes to 9 minutes, even more preferably from 3 minutes to 7 minutes.

When the raw tea leaves are brought into contact with the hot water by being immersed therein, the tea leaves and a washing solution may be separated from each other by filtration. For the filtration, for example, filter paper or a filter mode of a metal, such as stainless steel, may be used. The mesh size of the filter made of a metal is, for example, from 18 mesh to 300 mesh.

In addition, after the step (a), the tea leaves after the contact treatment are permitted to be used as they are in the next step, but water remaining on the surfaces of the tea leaves may be removed. As a method for the removal, the water may be removed by shaking or the like, or may be lightly wiped off with waste cloth, paper, or the like. In addition, the tea leaves after the step (a) may be dried.

In present invention, as a step (b), a step of cutting or pulverizing the tea leaves after the step (a) may be performed from the viewpoints of an enhancement in taste and flavor (richness of green tea), improvement in extraction efficiency of the non-polymer catechins, and an improvement in aesthetics. A cutting or pulverization method is not particularly limited, and for example, the cutting of the tea leaves may be performed using a cutter, or using a rolling machine, a rotorvane, or a CTC machine. In addition, the pulverization may be performed using a grinder, a mill, a ball mill, or the like. The tea leaves after the cutting each have a size of typically from 1 mm to 20 mm, preferably from 5 mm to 15 mm. In addition, tea leaves after the pulverization each have a size of typically from 0.1 mm to 5 mm, preferably from 0.3 mm to 3 mm.

Further, in the present invention, as a step (c), a step of extracting the tea leaves after the step (b) with water at from 50° C. to 100° C. may be performed. With this, the taste and flavor (richness of green tea) is enhance, and besides, the non-polymer catechins can be efficiently extracted.

Water similar to those described above may be used as the water to be used for the extraction. Of those, ion-exchanged water is preferred in terms of taste. An organic acid or a salt thereof, such as sodium ascorbate, or an inorganic acid or a salt thereof, such as sodium hydrogen carbonate, may be added to the water to be used for the extraction.

The temperature of the water to be used for the extraction, which is generally from 50° C. to 100° C., is preferably 60° C. or more, more preferably 70° C. or more, even more preferably 80° C. or more, from the viewpoints of an enhancement in richness of green tea and an improvement in extraction efficiency of the non-polymer catechins, and is preferably 98° C. or less, more preferably 95° C. or less, from the viewpoint of temperature control. Such temperature of the water falls within the range of preferably from 60° C. to 98° C., more preferably from 70° C. to 90° C., even more preferably from 80° C. to The amount of the water to be used for the extraction may be appropriately selected depending on the extraction method, but the amount of the water with respect to the raw tea leaves is preferably 1 time by mass or more, more preferably 1.5 times by mass or more, even more preferably 2 times by mass or more, from the viewpoint of the extraction efficiency of the non-polymer catechins, and is preferably 20 times by mass or less, more preferably 15 times by mass or less, even more preferably 10 times by mass or less, from the viewpoint of an enhancement in richness of green tea. Such amount of the water falls within the range of preferably from 1 time by mass to 20 times by mass, more preferably from 1.5 times by mass to 15 times by mass, even more preferably from 2 times by mass to 10 times by mass, with respect to the raw tea leaves.

A known method may be adopted as a method for the extraction, and it is preferred to perform stirring extraction with a homogenizer from the viewpoints of an enhancement in taste and flavor (richness of green tea), an improvement in extraction efficiency of the non-polymer catechins, and an improvement in aesthetics. Examples of the homogenizer include a high-speed homogenizer, an ultrasonic homogenizer, and a high-pressure homogenizer, and any of an immersion type, a line mixer type, and a batch closed vessel type may be used. Of those, an immersion type or a line mixer type is preferred from the viewpoint of performing treatment continuously. The number of revolutions of the homogenizer is preferably from 3,000 rpm to 30,000 rpm, more preferably from 4,000 rpm to 25,000 rpm, even more preferably from 5,000 rpm to 20,000 rpm, from the viewpoints of an enhancement in taste and flavor (richness of green tea), an improvement in extraction efficiency of the non-polymer catechins, and an improvement in aesthetics. In addition, a peripheral speed (tip speed of a stirring blade) is preferably from 9 (m/s) to 90 (m/s), more preferably from 12 (m/s) to 75 (m/s), even more preferably from 15 (m/s) to 60 (m/s), from the viewpoints of an enhancement in taste and flavor (richness of green tea), an improvement in extraction efficiency of the non-polymer catechins, and an improvement in aesthetics.

In addition, a period of time for which the extraction is performed varies depending on the scale and the like, but for example, is preferably 5 minutes or more, more preferably 8 minutes or more, even more preferably 10 minutes or more, from the viewpoints of an enhancement in taste and flavor (richness of green tea) and an improvement in extraction efficiency of the non-polymer catechins, and is preferably 120 minutes or less, more preferably 90 minutes or less, even more preferably 60 minutes or less, from the viewpoints of an improvement in aesthetics and a reduction in unpleasant taste or coarseness. Such period of time for which the extraction is performed falls within the range of preferably from 5 minutes to 120 minutes, more preferably from 8 minutes to 90 minutes, even more preferably from 10 minutes to 60 minutes.

After the step (c), solid-liquid separation may be performed to separate the tea leaves and the green tea extract from each other.

A method generally used in the food industry may be adopted as the solid-liquid separation. Examples thereof include filtration, centrifugation, and membrane treatment. One or a combination of more thereof may be performed.

For the filtration, for example, filter separation with filter paper, a filter made of a metal, such as stainless steel, or the like may be adopted. The mesh size of the filter made of a metal is, for example, from 18 mesh to 300 mesh.

In addition, in the paper filtration, for example, filter paper may be precoated with a filter aid. Examples of the filter aid include diatomaceous earth, cellulose, and a combination thereof, and the amount of the filter aid to be used may be appropriately selected. In addition, a filtration method such as pressure filtration or suction filtration may also be adopted.

A general device of, for example, a separation plate type, a cylinder type, or a decanter type may be used as a centrifuge to be used for the centrifugation.

A temperature during the centrifugation is preferably from 5° C. to 70° C., more preferably from 10° C. to 40° C., from the viewpoints of an increase in recovery ratio of the non-polymer catechins and the removal of impurities. In addition, the number of revolutions and a period of time may be appropriately set. For example, in the case of the separation plate type, the number of revolutions is preferably from 2,000 r/min to 10,000 r/min, more preferably from 2,500 r/min to 9,000 r/min, even more preferably from 3,000 r/min to 8,000 r/min, and the period of time is preferably from 0.2 minute to 75 minutes, more preferably from 0.5 minute to 60 minutes, even more preferably from 1 minute to 30 minutes.

With regard to conditions for treatment by the membrane filtration, the treatment may be performed under general filtration conditions.

A membrane pore size is preferably 0.1 μm or more, more preferably 0.15 μm or more, even more preferably 0.2 μm or more, and is preferably 10 μm or less, more preferably 5 μm or less, even more preferably 2 μm or less, from the viewpoints of an increase in recovery ratio of the non-polymer catechins and the removal of impurities. Such membrane pore size falls within the range of preferably from 0.1 μm to 10 μm, more preferably from 0.15 μm to 5 μm, even more preferably from 0.2 μm to 2 μm. A measurement method for the membrane pore size is exemplified by a general measurement method involving using a mercury intrusion method, a bubble point test, a bacterial filtration method, or the like, and it is preferred to use a value determined by a bubble point test.

As a material for the membrane, there may be given, for example, a polymer membrane, a ceramic membrane, and a stainless-steel membrane.

Thus, the green tea extract of the present invention may be produced.

Examples of the form of the green tea extract include various forms such as a liquid, a slurry, a semi-solid, and a solid. When a liquid is desired as the product form of the green tea extract, for example, the green tea extract may be concentrated by reduced-pressure concentration, reverse osmosis membrane concentration, or the like. In addition, when a solid is desired, for example, the green tea extract may be powdered by spray drying, freeze-drying, or the like.

The present invention further discloses the following green tea extract and production method therefor, and beverage composition regarding the embodiments described above.

<1-1>

A green tea extract, comprising:

non-polymer catechins and caffeine, in which (A) a mass ratio of caffeine/non-polymer catechins is 0.180 or less, and the green tea extract satisfies the following requirements (B) and (C) when subjected to concentration adjustment so as to nave a concentration of the non-polymer catechins of 175 mg/100 mL:

(B) fine particles contained in the concentration-adjusted solution have an average particle size of 3 μm or less; and (C) the concentration-adjusted solution has a turbidity of 30 NTU or more.

<1-2>

A green tea extract, obtained by a step (a) of bringing raw tea leaves into contact with hot water, in which (A) a mass ratio of caffeine/non-polymer catechins is 0.180 or less, and the green tea extract satisfies the following requirements (B) and (C) when subjected to concentration adjustment so as to have a concentration of the non-polymer catechins of 175 mg/100 mL:

(B) particles contained in the concentration-adjusted solution have an average particle size of 3 μm or less; an (C) the concentration-adjusted solution has a turbidity of 30 NTU or more.

<1-3>

A production method for a green tea extract, comprising a step (a) of bringing raw tea leaves into contact with hot water.

<1-4>

The green tea extract according to the above-mentioned item <1-1> or <1-2>, or the production method for a green tea extract according to the above-mentioned item <1-3> ("the green tea extract or the production method for a green tea extract" is hereinafter referred to as "green tea extract etc."), in which the green tea extract has a mass ratio of caffeine/non-polymer catechins of preferably from 0 to 0.180, more preferably from 0.001 to 0.175, more preferably from 0.001 to 0.170, more preferably from 0.01 to 0.165, even more preferably from 0.01 to 0.160.

<1-5>

The green tea extract etc. according to any one of the above-mentioned items <1-1> to <1-4>, wherein the green tea extract has a content of the non-polymer catechins in solids of preferably from 20 mass % to 60 mass %, more preferably from 25 mass % to 50 mass %, even more preferably from 30 mass % to 40 mass %.

<1-6>

The green tea extract etc. according to any one of the above-mentioned items <1-1> to <1-5>, wherein the green tea extract has a content of the caffeine in solids of preferably from 0 mass % to 11 mass %, more preferably tram 0.03 mass % to 9 mass %, even more preferably from 0.3 mass % to 6.5 mass %.

<1-7>

The green tea extra extract etc. according to any one of the above-mentioned items <1-1> to <1-6>, wherein, when the green tea extract is subjected to concentration adjustment so as to have a concentration of the non-polymer catechins of 175 mg/100 mL, particles contained in the concentration-adjusted solution have an average particle size of preferably from 0.1 μm to 3 μm, more preferably from 0.1 μm to 1.5 μm, more preferably from 0.2. μm to 0.9 μm, even more preferably from 0.3 μm to 0.6 μm.

<1-8>

The green tea extract etc. according to any one of the above-mentioned items <1-1> to <1-7>, wherein, when the green tea extract is subjected to concentration adjustment so as to have a concentration of the non-polymer catechins of 175 mg/100 mL, the concentration-adjusted solution has a turbidity of preferably from 30 NTU to 300 NTU, more preferably from 40 NTU to 300 NTU, more preferably from 50 NTU to 250 NTU, more preferably from 60 NTU to 200 NTU, more preferably from 80 NTU to 200 NTU, even more preferably from 85 NTU to 200 NTU.

<1-9>

A green tea extract, comprising:

non-polymer catechins; and caffeine, in which (A) a mass ratio of caffeine/non-polymer catechins is 0.01 to 0.160, and the green tea extract satisfies the following requirements (B) and (C) when subjected to concentration adjustment so as to have a concentration of the non-polymer catechins of 175 mg/100 mL:

(B) fine particles contained in the concentration-adjusted solution have an average particle size of from 0.2 to 0.9; and (C) the concentration-adjusted solution has a turbidity of from 80 NTU to 200 NTU.

<1-10>

The green tea extract according to the above-mentioned item <1-9>, wherein the turbidity of the concentration-adjusted solution is from 85 NTU to 200 NTU.

<1-11>

The green tea extract according to the above-mentioned item <1-9> or <1-10>, wherein the green tea extract preferably has a content of the non-polymer catechins in solids of from 30 mass % to 40 mass %.

<1-12>

The green tea extract etc. according to any one of the above-mentioned items <1-1> to <1-11>, wherein the particles comprise preferably water-insoluble suspended solids and/or settleable suspended solids, more preferably water-insoluble suspended solids and/or settleable suspended solids contained in the green tea extract.

<1-13>

The green tea extract etc. according to any one of the above-mentioned items <1-1> to <1-12>, wherein the form of the green tea extract preferably comprises a liquid, a slurry, a semi-solid, or a solid.

<1-14>

The green tea extract etc. according to any one of the above-mentioned items <1-1> to <1-12>, wherein the non-polymer catechins comprise at least one selected from epigallocatechin gallate, gallocatechin gallate, epicatechin gallate, catechin gallate epigallocatechin, gallocatechin, epicatechin, and catechin, more preferably all of the eight kinds.

<2-1>

A beverage composition, comprising the green tea extract of any one of the above-mentioned items <1-1>, <1-2>, and <1-4> to <1-14> blended therein.

<2-2>

A beverage composition, comprising:

no polymer catechins and caffeine, the beverage composition satisfying the following requirements (A), (B), and (C):

(A) a mass ratio of caffeine/non-polymer catechins is 0.180 or less;

(B) particles contained in the beverage composition have an average particle size of 3 μm or less; and (C) a turbidity is 30 NTU or more.

<2-3>

The beverage composition according to the above-mentioned item <2-1> or <2-2>, wherein the mass ratio of caffeine/non-polymer catechins is preferably from 0 to 0.180, more preferably from 0.001 to 0.175, more preferably from 0.001 to 0.170, more preferably from 0.01 to 0.165, even more preferably from 0.01 to 0.160.

<2-4>

The beverage composition according to any one of the above-mentioned items <2-1> to <2-3≤, wherein the content of the non-polymer catechins in the beverage composition is preferably from 30 mg/100 mL to 200 mg/100 mL, more preferably from 40 mg/100 mL to 190 mg/100 mL, more preferably from 80 mg/100 mL to 180 mg/100 mL, even more preferably from 110 mg/100 mL to 180 mg /100 mL.

<2-5>

The beverage composition according to any one of the above-mentioned items <2-1> to <2-4>, wherein the content of the the caffeine in the beverage composition is preferably from 0 mg/100 mL to 36 mg/100 mL, more preferably from 0.18 mg/100 mL to 33 mg/100 mL, even more preferably from 1.8 mg/100 mL to 30 mg/100 mL.

The beverage composition according to any one of the above-mentioned items <2-1> to <2-5>, wherein an average particle size of particles contained in the beverage composition is preferably from 0.1 μm to 3 μm, more preferably from 0.1 μm to 1.5 μm, more preferably from 0.2 μm to 0.9 μm, even more preferably from 0.3 μm to 0.6 μm.

The beverage composition according to any one of the above-mentioned items <2-1> to <2-6>, wherein a turbidity of the beverage composition is preferably from 30 NTU to 300 NTU, more preferably from 40 NTU to 300 NTU, more preferably from 50 NTU to 250 NTU, more preferably from 60 NTU to 200 NTU, more preferably from 80 NTU to 200 NTU, even more preferably from 85 NTU to 200 NTU.

<2-8>

A beverage composition, comprising:
non-polymer catechins and caffeine,
the beverage composition satisfying the following requirements (A), (B), and (C):
(A) a mass ratio of caffeine/non-polymer catechins is from 0.01 to 0.160;
(B) particles contained in the beverage composition have an average particle size of from 0.2 μm to 0.9 μm; and
(C) a turbidity is from 80 NTU to 200 NTU.

<2-9>

The beverage composition according to the above-mentioned item <2-8>, wherein the turbidity is from 85 NTU to 200 NTU.

<2-10>

The beverage composition according to the above-mentioned item <2-8> or <2-9>, wherein a content of the non-polymer catechins in the beverage composition is preferably from 110 mg/100 mL to 180 mg/100 mL.

<2-11>

The beverage composition according to any one of the above-mentioned items <2-1> to <2-10>, wherein the particles comprise preferably water-insoluble suspended solids and/or settleable suspended solids, more preferably water-insoluble suspended solids and/or settleable suspended solids contained in the green tea extract.

<2-12>

The beverage composition according to any one of the above-mentioned items <2-1> to <2-11>, preferably further comprising one or more of additives selected from a sweetener, a flavoring agent, a dye, a vitamin, a fruit juice extract, a vegetable extract, a nectar extract, an herb, an organic acid, an organic acid salt, an inorganic acid, an inorganic acid salt, an inorganic salt, an antioxidant, a pH adjuster, and a quality stabilizer.

<2-13>

The beverage composition according to any one of the above-mentioned items <2-1> to <2-12>, wherein the beverage composition comprises preferably a tea beverage composition or a non-tea beverage composition, more preferably a tea beverage composition, even more preferably a green tea beverage composition.

<2-14>

The beverage composition according to the above-mentioned item <2-13>, wherein the tea beverage composition preferably comprises a green tea beverage, an oolong tea beverage, or a black tea beverage.

<2-15>

The beverage composition according to the above-mentioned item <2-13>, wherein the non-tea beverage composition preferably comprises a non-alcoholic beverage or an alcoholic beverage.

<2-16>

The beverage composition according to the above-mentioned item <2-15>, wherein the non-alcoholic beverage preferably comprises a carbonated beverage, a fruit juice, a vegetable juice, a sports beverage, an isotonic beverage, enhanced water, bottled water, near water, a coffee beverage, an energy drink, or a drink for beauty, and the alcoholic beverage preferably comprises beer, wine, Japanese sake, a plum liquor, a sparkling liquor, whisky, brandy, a clear liquor, rum, gin, or a liqueur.

<2-17>

The beverage composition according to any one of the above-mentioned items <2-1> to <2-16>, wherein the form of the beverage composition preferably comprises a liquid, a gel, or a slurry.

<2-18>

The beverage composition according to any one of the above-mentioned items <2-1> to <2-17>, which is a packaged beverage.

<2-19>

The beverage composition according to the above-mentioned item <2-18>, wherein a container for the packaged beverage preferably comprises a molded container mainly formed of polyethylene terephthalate (so-called PET bottle), a metal can, a paper container composited with a metal foil or a plastic film, or a bottle.

<2-20>

The beverage composition according to any one of the above-mentioned items <2-1> to <2-19>, wherein the beverage composition has been subjected to heat sterilization.

<2-21>

The beverage composition according to the above-mentioned item <2-20>, wherein a method for the sterilization comprises preferably a method that complies with a condition specified by an applicable regulation (Food Sanitation Act in Japan), more preferably a retort sterilization method, a high-temperature short-time sterilization method (HTST method), or an ultrahigh-temperature sterilization method (UHT method).

<2-22>

The beverage composition according to any one of the above-mentioned items <2-1> to <2-21>, wherein the non-polymer catechins comprise at least one selected from epigallocatechin gallate, gallocatechin gallate, epicatechin gallate, catechin gallate, epigallocatechin, gallocatechin, epicatechin, and catechin, more preferably all of the eight kinds.

EXAMPLES

1. Analysis of Non-Polymer Catechins and Caffeine

A sample dilated with pure water was measured by a gradient method using a high-performance liquid chromatograph (model SCL-10AVP) manufactured by Shimadzu Corporation having mounted thereon an octadecyl group-introduced packed column for liquid chromatography (L-column TM ODS, 4.6 mmφ×250 mm: manufactured by Chemicals Evaluation and Research Institute, Japan) at a column temperature of 35° C. The measurement was carried out using a distilled water solution containing 0.1 mol/L acetic acid as a mobile phase solution A and an acetonitrile solution containing 0.1 mol/L acetic acid as a mobile phase solution B under the conditions of a flow rate of 1 mL/min, a sample injection volume of 10 μL, and a UV detector wavelength of 280 nm. The gradient conditions are as described below.

Concentration Gradient Condition (Vol %)

| Time | Solution A concentration | Solution B concentration |
|---|---|---|
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 60 min | 97% | 3% |

Retention Times of Non-Polymer Catechins and Caffeine
(1) Catechin (C): 25.4 min
(2) Epicatechin (EC): 31.4 min
(3) Epicatechin gallate (ECg): 40.7 mm
(4) Epigallocatechin gallate (EGCg): 31.7 min
(5) Gallocatechin gallate (GCg): 33.9 min
(6) Catechin gallate (Cg): 41.4 min
(7) Epigallocatechin (EGC): 23.5 min
(8) Gallocatechin (GC): 14.7 min
(9) Caffeine: 26.9 min On the basis of the area % thus determined, the contents (mass %) of the non-polymer catechins and caffeine were determined using reagents (C, EC, ECg, EGCg, GCg, Cg, EGC, and GC: manufactured by Mitsui Norin Co., Ltd., caffeine: Wako Pure Chemcal Industries, Ltd.) as standard substances.

2. Measurement of Turbidity

The turbidity of each of tea beverages obtained in Examples and Comparative Examples to be described later was measured at 25° C. using a turbidimeter (TN-100 manufactured by Eutecn Instruments Pte Ltd.).

3. Calculation Method for Change Ratio of Turbidity

A change ratio of turbidity was determined by the following eduation from the turbidity (NTU) of a sample before storage and the turbidity (NTU) of the sample after storage at 5° C. for 7 days.

Change ratio of turbidity (%)=|(turbidity after storage-turbidity before storage)|/(turbidity before storage)×100

4. Measurement of Average Particle Size of Particles

The average particle size of particles in each of the tea beverages obtained in Examples and Comparative Examples to be described later was measured usig a laser diffraction/scattering particle size distribution measurement apparatus LA-920 (manufactured bar Horiba). In this measurement, as required, concentration adjustment was performed using ion-exchanged water as to achieve an appropriate transmittance.

5. Sensory Evaluation

Each of the tea beverages obtained in Examples and Comparative Examples to be described later was drunk by an expert panel of four members, and evaluated for the richness of green tea on a five-point scale. After that, a final score was determined through discussion.

Evaluation Criteria

5: Fully having richness of green tea (the richness is felt more than in Example 7)
4: Having richness of green tea (equivalent to Example 7)
3: Rather having richness of green tea (the richness is felt more than in Comparative Example: 4, but not felt as much as in Example 7)
2: Slightly having richness of green tea (equivalent to Comparative Example 4)
1: Having no richness of green tea (the richness is not felt as much as in Comparative Example 4)

Example 1

100 g of raw tea leaves as full leaves were immersed in 1,000 g of ion-exchanged water at 90° C. for 180 seconds. Next, filtration was performed with a mesh to recover tea leaves, and an extract solution of the tea leaves was discarded.

Next, the recovered tea leaves were cut with a food processor. The tea leaves after the cutting each had a size of about 3 mm.

Next, 500 g of ion-exchanged water at 90° C. was added to the tea leaves after the cutting, and stirring extraction was performed using a homogenizer (manufactured by Hsiangtai Machinery Industry Co., Ltd., blade diameter: 3 cm) under the conditions of a number of revolutions of 10,000 rpm and 30 minutes, followed by filtration to provide a green tea extract.

The resultant green tea extract was diluted with ion-exchanged water to a concentration of the non-polymer catechins of 0.175 g/100 mL to prepare a tea beverage, which was subjected to the analysis and the sensory evaluation. The results are shown in Table 1.

Examples 2 to 8

Green tea extracts were obtained by the same procedure as in Example 1, and then caffeine was added so as to achieve mass ratio "caffeine/non-polymer catechins" shown in Table 1. Subsequently, the resultant green tea extracts were diluted with ion-exchanged water so as to have concentrations of the non-polymer catechins shown in Table 1 to prepare tea beverages, which were subjected to the analysis and the sensory evaluation. The results are shown in Table 1.

Example 9

A green tea extract was obtained by the same procedure as in Example 1, and then the green tea extract was freeze-dried to provide a powdered green tea extract. The resultant powdered green tea extract was diluted with ion-exchanged water so as to have a concentration of the non-polymer catechins shown in Table 1 to prepare a tea beverage, which was subjected to the analysis and the sensory evaluation. The results are shown in Table 1.

Example 10

A green tea extract was obtained by the same procedure as in Example 1 except that, in Example 1, the number of revolutions of the homogenizer was changed to 15,000 rpm. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 1

A green tea extract was obtained by the same procedure as in Example 1, and then caffeine was added so as to achieve a mass ratio "caffeine/non-polymer catechins"

shown in Table 1. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 2

1,000 g of steam at 100° C. was brought into contact with 100 g of raw tea leaves as full leaves for 60 seconds.

Next, recovered tea leaves were cut and extracted by the same procedure as in Example 1 to provide a green tea extract. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 3

200 g of a powdered green tea extract (POLYPHENON G, manufactured by Mitsui Norin Co., Ltd.) was added to 800 g of a 68 mass % aqueous ethanol solution in a 2 L four-necked round-bottom flask, and then 37 g of acid clay (MIZUKA ACE #600, manufactured by Mizusawa Industrial Chemicals, Ltd.), 28 g of activated carbon (GLC, manufactured by Kuraray Chemical Co., Ltd.), and 12 g of a filter aid (Solka-Floc, manufactured by Kurita Water Industries Ltd.) were added. After that, the mixture was stirred at 25° C. for 2 hours. Subsequently, the resultant was filtered, and the filtrate was treated with a 0.45 μm filter. Subsequently, the ethanol solvent was removed by evaporation by reduced-pressure concentration to provide a green tea extract. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 4

A green tea extract was obtained by the same procedure as in Example 1. After that, a pencil-type module (manufactured by Asahi Kasei Chemicals Corporation, pore size: 0.2 μm, material: polyvinylidene fluoride) serving as a microfiltration module was mounted, and the green tea extract was subjected to pressure filtration at a gauge pressure of 100 kPa and a temperature of 25° C. to provide a green tea extract. The resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 5

A green tea extract was obtained by the same procedure as in Example 1 except that, in Example 1, stirring extraction was performed using a propeller stirring blade (blade diameter: 5 cm) at a number of revolutions of 50 rpm in place of the stirring extraction with the homogenizer. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in. Table 1.

Comparative Example 6

A green tea extract was obtained by the same procedure as in Comparative Example 5 except that, in Comparative Example 5, the steaming treatment described in Comparative Example 2 was performed in place of the hot water treatment. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

Comparative Example 7

100 g of raw tea leaves as full leaves were immersed in 1,000 g of ion-exchanged water at 90° C. for 180 seconds. Next, filtration was performed with a mesh to recover tea leaves, and an extract solution of the tea leaves was discarded.

Next, the recovered tea leaves were cut with a food processor. The tea leaves after the cutting each had a size of about 3 mm.

Next, 500 g of ion-exchanged water at 90° C. was added to the tea leaves after the cutting, and stirring extraction was performed using a propeller stirring blade under the conditions of a number of revolutions of 50 rpm and 30 minutes, followed by filtration to provide a green tea extract. A pencil-type module (manufactured by Asahi Kasei Chemicals Corporation, pore size: 0.2 μm, material: polvinylidene fluoride) serving as a microfiltration module was mounted, and the resultant green tea extract was subjected to pressure filtration at a gauge pressure of 100 kPa and a temperature of 25° C. to provide a green tea extract. Subsequently, the resultant green tea extract was diluted with ion-exchanged water so as to have a concentration of the non-polymer catechins shown in Table 1, and powdered tea was added to prepare a tea beverage, which was subjected to the analysis and the sensory evaluation. The results are shown in Table 1.

Comparative Example 8

A green tea extract was obtained by the same procedure as in Comparative Example 7 except that, in Comparative Example 7, the steaming treatment described in Comparative Example 2 was performed in place of the hot water treatment. Subsequently, the resultant green tea extract was diluted with ion-exchanged water so as to have a concentration of the non-polymer catechins shown in Table 1 to prepare a tea beverage, which was subjected to the analysis and the sensory evaluation. The results are shown in Table 1.

TABLE 1

|  | Example 1 | Example 2 | Example 3 | Example 4 | Example 5 | Example 6 |
|---|---|---|---|---|---|---|
| Production Method | Raw tea leaves ↓ Hot water | Raw tea leaves ↓ Hot water | Raw tea leaves ↓ Hot water | Raw tea leaves ↓ Hot water | Raw tea leaves ↓ Hot water | Raw tea leaves ↓ Hot water |

TABLE 1-continued

|  |  |  |  |  |  |  |  |
|---|---|---|---|---|---|---|---|
|  |  | treatment ↓ Cutting ↓ Homogenizer extraction ↓ Solid-liquid separation ↓ Concentration adjustment | treatment ↓ Cutting ↓ Homogenizer extraction ↓ Solid-liquid separation ↓ Addition of caffeine ↓ Concentration adjustment | treatment ↓ Cutting ↓ Homogenizer extraction ↓ Solid-liquid separation ↓ Addition of caffeine ↓ Concentration adjustment | treatment ↓ Cutting ↓ Homogenizer extraction ↓ Solid-liquid separation ↓ Addition of caffeine ↓ Concentration adjustment | treatment ↓ Cutting ↓ Homogenizer extraction ↓ Solid-liquid separation ↓ Addition of caffeine ↓ Concentration adjustment | treatment ↓ Cutting ↓ Homogenizer extraction ↓ Solid-liquid separation ↓ Addition of caffeine ↓ Concentration adjustment |
| Analysis | Non-polymer catechins in solids [mass %] | 35 | 34 | 33 | 33 | 34 | 34 |
|  | Caffeine in solids [mass %] | 3.0 | 3.6 | 5.2 | 5.6 | 3.6 | 3.6 |
|  | Caffaine/non-polymer catechins [—] | 0.085 | 0.108 | 0.154 | 0.165 | 0.108 | 0.108 |
|  | Non-polymer catechins after concentration adjustment [mg/100 mL] | 175 | 175 | 175 | 175 | 115 | 99 |
|  | Turbidity after concentration adjustment [NTU] | 147 | 146 | 149 | 146 | 85 | 73 |
|  | Average particle size after concentration adjustment [μm] | 0.8 | 0.8 | 0.8 | 0.8 | 0.8 | 0.8 |
| Evaluation | Change ratio of turbidity [%] | 8 | 6 | 7 | 9 | 5 | 7 |
|  | Richness of green tea | 5 | 5 | 5 | 5 | 5 | 4 |

|  |  | Example 7 | Example 8 | Example 9 | Example 10 | Comparative Example 1 | Comparative Example 2 |
|---|---|---|---|---|---|---|---|
| Production Method |  | Raw tea leaves ↓ Hot water treatment ↓ Cutting ↓ Homogenizer extraction ↓ Solid-liquid separation ↓ Addition of caffeine ↓ Concentration adjustment | Raw tea leaves ↓ Hot water treatment ↓ Cutting ↓ Homogenizer extraction ↓ Solid-liquid separation ↓ Addition of caffeine ↓ Concentration adjustment | Raw tea leaves ↓ Hot water treatment ↓ Cutting ↓ Homogenizer extraction ↓ Solid-liquid separation ↓ Powderization ↓ Concentration adjustment by dilution with water | Raw tea leaves ↓ Hot water treatment ↓ Cutting ↓ Homogenizer extraction ↓ Solid-liquid separation ↓ Concentration adjustment | Raw tea leaves ↓ Hot water treatment ↓ Cutting ↓ Homogenizer extraction ↓ Solid-liquid separation ↓ Addition of caffeine ↓ Concentration adjustment | Raw tea leaves ↓ Steaming treatment ↓ Cutting ↓ Homogenizer extraction ↓ Solid-liquid separation ↓ Concentration adjustment |
| Analysis | Non-polymer catechins in solids [mass %] | 34 | 34 | 35 | 34 | 32 | 33 |
|  | Caffeine in solids [mass %] | 3.6 | 3.6 | 3.0 | 3.0 | 6.0 | 6.1 |
|  | Caffaine/non-polymer catechins [—] | 1.108 | 0.108 | 0.085 | 0.088 | 0.188 | 0.186 |
|  | Non-polymer catechins after concentration adjustment [mg/100 mL] | 88 | 44 | 175 | 175 | 175 | 175 |
|  | Turbidity after concentration adjustment [NTU] | 65 | 31 | 149 | 141 | 149 | 156 |
|  | Average particle size after concentration adjustment [μm] | 0.8 | 0.8 | 0.8 | 0.5 | 0.8 | 0.8 |
| Evaluation | Change ratio of turbidity [%] | 5 | 7 | 8 | 8 | 14 | 13 |
|  | Richness of green tea | 4 | 4 | 5 | 5 | 5 | 5 |

TABLE 1-continued

|  |  | Comparative Example 3 | Comparative Example 4 | Comparative Example 5 | Comparative Example 6 | Comparative Example 7 | Comparative Example 8 |
|---|---|---|---|---|---|---|---|
| Production Method | | Green tea extract ↓ Addition of ethanol ↓ Addition of clay and activated carbon ↓ Solid-liquid separation ↓ Removal of ethanol by evaporation ↓ Concentration adjustment | Raw tea leaves ↓ Hot water treatment ↓ Cutting ↓ Homogenizer extraction ↓ Solid-liquid separation ↓ NF treatment ↓ Concentration adjustment | Raw tea leaves ↓ Hot water treatment ↓ Cutting ↓ Extraction ↓ Solid-liquid separation ↓ Concentration adjustment | Raw tea leaves ↓ Steaming treatment ↓ Cutting ↓ Extraction ↓ Solid-liquid separation ↓ Concentration adjustment | Raw tea leaves ↓ Hot water treatment ↓ Cutting ↓ Extraction ↓ Solid-liquid separation ↓ NF treatment ↓ Concentration adjustment ↓ Addition of powdered tea | Raw tea leaves ↓ Steaming treatment ↓ Cutting ↓ Extraction ↓ Solid-liquid separation ↓ NF treatment ↓ Concentration adjustment ↓ Addition of powdered tea |
| Analysis | Non-polymer catechins in solids [mass %] | 43 | 37 | 35 | 34 | 37 | 37 |
| | Caffeine in solids [mass %] | 3.4 | 3.1 | 3.1 | 6.3 | 3.3 | 7.0 |
| | Caffaine/non-polymer catechins [—] | 0.080 | 0.084 | 0.088 | 0.186 | 0.089 | 0.191 |
| | Non-polymer catechins after concentration adjustment [mg/100 mL] | 175 | 175 | 175 | 175 | 88 | 88 |
| | Turbidity after concentration adjustment [NTU] | 1 or less | 1 or less | 151 | 141 | 82 | 78 |
| | Average particle size after concentration adjustment [μm] | — | — | 5 | 5 | 20 | 20 |
| Evaluation | Change ratio of turbidity [%] | — | — | 70 | 78 | 95 | 95 |
| | Richness of green tea | 1 | 2 | 4 | 4 | 4 | 4 |

It is found from Table 1 that a beverage composition achieving both an improvement in taste and flavor by the increase of a turbid component and an improvement in aesthetics by the suppression of the settlement of the turbid component is obtained by controlling the mass ratio "caffeine/non-polymer catechins" and the average particle size of particles to values equal to or lower than specific values, and controlling the turbidity to a value equal to or higher than a specific value.

The invention claimed is:

1. A green tea extract, comprising:
   non-polymer catechins,
   caffeine, and
   fine particles, as an insoluble component of the green tea extract, obtained by a process comprising extraction of raw tea leaves with hot water,
   wherein
   (A) a mass ratio of caffeine/non-polymer catechins is 0.180 or less, and a content of the non-polymer catechins in solids is from 20 mass % to 60 mass %, and the green tea extract satisfies requirements (B) and (C) when subjected to concentration adjustment so as to have a concentration of the non-polymer catechins of 175 mg/100 mL:
   (B) the fine particles contained in the green tea extract subjected to the concentration adjustment have an average particle size of from 0.2 μm to 3 μm; and
   (C) the green tea extract subjected to the concentration adjustment has a turbidity of at least 30 NTU.

2. The green tea extract of claim 1, wherein the average particle size is from 0.2 μm to 0.9 μm.

3. The green tea extract of claim 1, wherein the turbidity is at least 80 NTU.

4. The green tea extract of claim 1, wherein the mass ratio of caffeine/non-polytner catechins is from 0.01 to 0.160.

5. The green tea extract of claim 1. wherein the turbidity is from 85 NTU to 200 NTU.

6. The green tea extract of claim 1, wherein the content of the non-polymer catechins in solids is from 25 mass % to 50 mass %.

* * * * *

UNITED STATES PATENT AND TRADEMARK OFFICE
CERTIFICATE OF CORRECTION

PATENT NO. : 11,903,394 B2
APPLICATION NO. : 17/896244
DATED : February 20, 2024
INVENTOR(S) : Kenji Yamawaki et al.

Page 1 of 1

It is certified that error appears in the above-identified patent and that said Letters Patent is hereby corrected as shown below:

In the Claims

Column 21, Line 55, "caffeinelnon-polymer" should read --caffeine/non-polymer--.

Signed and Sealed this
Eleventh Day of June, 2024

Katherine Kelly Vidal
*Director of the United States Patent and Trademark Office*